United States Patent Office 2,778,847
Patented Jan. 22, 1957

2,778,847

PROCESS FOR PRODUCING ACRYLONITRILE

Yoshisato Fujisaki, Kochi-shi, Kochi-ken, and Tsuyoshi Takemoto, Onorison, Toyoda-gun, Hiroshima-ken, Japan, assignors to Asahi Kasei Kogyo Kabushiki Kaisha, Osaka, Japan, a corporation of Japan No Drawing. Application August 21, 1953, Serial No. 375,824

5 Claims. (Cl. 260—465.3)

This invention relates to the production of unsaturated nitriles and more particularly to a process of producing acrylonitrile (vinyl cyanide).

Heretofore, the production of acrylonitrile from acetylene and hydrogen cyanide in a liquid phase in the presence of catalysts mentioned hereinafter has been well known to the skilled in the art. In the process, gaseous acetylene and hydrogen cyanide were introduced into an acidic aqueous solution containing substances such as cuprous chloride, bromide or iodide, and ammonium bromide or chloride or the corresponding sodium or potassium salts with stirring at ordinary or elevated temperatures. A strong mineral acid such as hydrochloric, hydrobromic, sulfuric or phosphoric acid might be used to keep the aqueous solution acidic. Acetylene may be used theoretically in an amount of one part by volume per one part by volume of hydrogen cyanide, but, practically, 8 to 10 parts by volume of acetylene are required per one part by volume of hydrogen cyanide. This is due to the fact that, in case a smaller amount of acetylene is used, the activity of the catalysts is so reduced that the yield of acrylonitrile relative to hydrogen cyanide is considerably lowered. The reasons therefor have not yet been disclosed clearly enough. According to a theory mostly believed at present, hydrogen cyanide may tend to react primarily with a catalyst component such as cuprous chloride to convert it entirely to another inactive substance such as copper cyanide, whereby the catalyst activity may be considerably reduced. However, use of excessive acetylene causes reduction of yield of acrylonitrile relative to acetylene because of a side reaction producing unfavorable impurities and reducing activity of the catalysts. Furthermore, acrylonitrile thus obtained has a purity of no more than 70 to 80%, containing higher homologues of acetylene such as acetaldehyde, paraldehyde, monovinylacetylene, divinylacetylene and the like as impurities, and the yield thereof is merely 70 to 90%.

We have found that various advantages can be attained by preliminarily replacing 1 to 13% by weight of cuprous halides normally present in the ordinary catalytic solution with cuprous cyanide which has been deemed as an undesirable inhibitor of acrylonitrile formation. This is an astonishing fact and contributes eminently to the formation of acrylonitrile. However, the reasons why said preliminarily added cuprous cyanide is favorable are not clear to us, but the validity of this invention is not thereby at all affected.

It is to be noted that said cuprous cyanide is preliminarily added to the catalytic solution before the gaseous acetylene and hydrogen cyanide is introduced therein, otherwise the effects can not be expected.

An object of the present invention is to reduce the amount of acetylene required for the reaction to as low as 3.5 parts by volume per one part by volume of hydrogen cyanide.

Another object of the present invention is to minimize loss of reactants and amount of impurities produced by side reactions of hydrogen cyanide and acetylene, and to prolong duration of activity of the catalysts.

A further object of the present invention is to improve yield of acrylonitrile relative to hydrogen cyanide.

A still further object of the present invention is to improve purity of the product acrylonitrile up to 75-90%.

Other objects of the present invention will be clear from the following descriptions.

According to the present invention, 1 to 13% by weight of cuprous halides such as cuprous chloride normally present in the known catalyst acidic solution is preliminarily replaced by cuprous cyanide. In the preferred embodiments of the invention, a mixture of hydrogen cyanide and acetylene in desired proportions hereinbelow set forth is led into the acidic solution containing cuprous chloride and cuprous cyanide in the proportions mentioned above at a temperature between 80 and 95° C. The proportion of acetylene to hydrogen cyanide in said mixture may be maintained at 3.5–7:1.

It is preferable that the acidic solution contains cuprous compounds as much as possible. However, since cuprous chloride in itself is relatively hardly soluble in water, it is desirable to incorporate in the acidic solution a compound such as ammonium chloride, ethanolamine hydrochloride and potassium chloride, which form soluble cuprous complexes with cuprous chloride. Metallic copper may be added in the acidic solution to prevent the formation of cupric compound during the reaction so that the soluble copper may be maintained in cuprous condition. A reaction temperature of 80–95° C. is preferred. To produce more pure acrylonitrile in higher yield from acetylene and hydrogen cyanide and to prolong duration of the activity of catalysts, it is satisfactory to keep merely the ratios of acetylene to hydrogen cyanide within the range of 3.5–7:1, respectively, when cuprous cyanide is contained from 1 to 13% (by weight) of cuprous chloride.

The warm gas generated from the reaction contains acrylonitrile and unreacted acetylene. Refrigeration of the gas to −15° C. or even as low as −50° C. gives a condensate which consists essentially of acrylonitrile and water. The uncondensed gas, chiefly consisting of acetylene, may be recycled.

For the purpose of illustrating the invention, certain specific examples are set forth here below. It is to be understood that these specific examples are to illustrate only certain embodiments of the invention.

*Example 1*

A catalyst solution was prepared as follows: 1440 grams of cuprous chloride, 760 grams of ammonium chloride and 10 grams of metallic copper tips were thrown into 1220 grams of water at 85° C. to dissolve cuprous chloride in the water.

Then the catalyst was placed in a reaction vessel fitted with a gas inlet tube, a mercury sealed stirrer and a gas exit tube, the last being led to a water-cooled continuous separator. Two condensers were connected in series with the top of the separator, the first being cooled at about −10° C. and the second at −70° to −60° C. A side tube from the separator was led to a closed receiver kept at room temperature. A steam-heated water jacket was provided around the reaction vessel.

The catalyst solution was heated to 85° C. Nitrogen was passed through during the heating to effect agitation and to prevent oxidation. Sufficient amount of concentrated hydrochloric acid was then added to bring the pH of the solution to 2. A gaseous mixture of acetylene and hydrogen cyanide in the proportion of 5 moles of the former to one mole of the latter was then fed into the heated catalyst solution at a rate of 80 liters per hour, the catalyst solution being stirred continuously throughout the reaction.

The reaction mixture was maintained at a temperature of about 80–95° C. during the reaction.

The product, together with steam and gaseous byproducts, containing unchanged acetylene was led into the separator, and thence into the condensers. The condensate was brought back to the separator to form two layers, the lower aqueous layer being returned to the reaction vessel and the upper aqueous layer of acrylonitrile being passed to the receiver.

After an 80 hours' run the gas feed was shut off and nitrogen was passed through the catalyst solution while the latter was cooled to room temperature.

Purity of the collected crude acrylonitrile was 65%. Impurities contained therein were byproducts induced from acetylene. The conversion percentage of hydrogen cyanide to acrylonitrile was found to be 81%.

Further, according to the present invention, a reaction was effected in the same manner as the preceding process, but 40 grams of cuprous cyanide were used in place of 40 grams of 1440 grams of cuprous chloride. The amount of cuprous cyanide corresponds to about 3% by weight of cuprous chloride.

Reaction was carried out likewise. Purity of the crude acrylonitrile was 78%. The conversion percentage of hydrogen cyanide to acrylonitrile was found to be 98%.

We found that the activity of the catalyst of the latter case decreases slower than the former case, that is in the former process, after 400 hours the conversion percentage of hydrogen cyanide was decreased to 62%, but, in the latter, even after 1000 hours the conversion percentage of hydrogen cyanide stood still at 82%.

*Example 2*

The catalyst solution was prepared as follows: 1440 grams of cuprous chloride, 760 grams of ammonium chloride and 10 grams of metallic copper powder were thrown into 1220 grams of water at 85° C. to dissolve the cuprous chloride in the water. The acetylene and hydrogen cyanide were mixed in the ratio of 3.5:1 and the mixed gas was fed at a rate of 100 liters per hour into the catalyst solution. After 50 hours, the conversion percentage of hydrogen cyanide to acrylonitrile was found to be 76%, and the purity of the crude acrylonitrile thus obtained was 63%.

Further, in accordance with the present invention, a reaction was effected after the manner of the preceding process, but 160 grams of cuprous cyanide were used in place of 160 grams of said 1440 grams of cuprous chloride. The amount of cuprous cyanide corresponds to about 12.5% by weight of cuprous chloride.

Reaction was carried out as before. Purity of the crude acrylonitrile thus obtained was 81%. The conversion percentage of hydrogen cyanide to acrylonitrile was found to be 97%.

The present invention accomplishes a substantially complete conversion of hydrogen cyanide to acrylonitrile with a minimum formation of byproducts, with the aid of a catalyst in which 1–13% by weight of the cuprous chloride is preliminarily replaced by cuprous cyanide, and with the aid of decreasing molar ratio of acetylene to hydrogen cyanide to 3.5–7:1. The duration of activity of the catalyst is also extremely prolonged by this invention.

The similar results were obtained in the examples when cuprous bromide or iodide was used in place of cuprous chloride, and ammonium bromide, potassium chloride, potassium bromide and the like in place of ammonium chloride.

The invention is described above in a specific embodiment but is not to be limited thereto but is to be construed broadly and restricted solely by the scope of the following claims.

What we claim is:

1. A process for the preparation of acrylonitrile, which comprises introducing hydrogen cyanide and acetylene into an aqueous solution containing dissolved therein, as catalyst, (*a*) a cuprous halide selected from the group consisting of cuprous chloride, cuprous bromide and cuprous iodide and (*b*) cuprous cyanide, the quantity of cuprous cyanide being 1 to 13% by weight of the cuprous halide, whereby reaction between the hydrogen cyanide and acetylene takes place with formation of acrylonitrile.

2. A process according to claim 1, wherein the catalyst-containing solution also contains a member selected from the group consisting of ammonium and alkali metal halides, in addition to metallic copper and mineral acid.

3. A process according to claim 1, wherein the hydrogen cyanide and acetylene are introduced in the proportion of one part of hydrogen cyanide to 3.5–7 parts of acetylene.

4. A process according to claim 1, wherein the reaction is carried out at a temperature of 80 to 95° C.

5. A process for the preparation of acrylonitrile, which comprises introducing a gaseous mixture of hydrogen cyanide and acetylene in the proportion of one part of hydrogen cyanide to 3.5–7 parts of acetylene into an aqueous solution containing cuprous chloride and cuprous cyanide amounting to at least 1% by weight of the cuprous chloride dissolved therein, as catalyst, and also containing ammonium chloride, metallic copper and hydrochloric acid to provide an acid pH, maintaining the reaction mixture at a temperature of 80 to 95° C., whereby reaction between the hydrogen cyanide and acetylene takes place with formation of acrylonitrile.

References Cited in the file of this patent

UNITED STATES PATENTS

| | | |
|---|---|---|
| Re. 23,265 | Kurtz | Sept. 5, 1950 |
| 2,385,327 | Bradley et al. | Sept. 25, 1945 |
| 2,423,318 | Howk | July 1, 1947 |
| 2,447,600 | Schulze et al. | Aug. 24, 1948 |
| 2,553,008 | Sager | May 15, 1951 |
| 2,688,632 | Carpenter et al. | Sept. 7, 1954 |